(No Model.)

A. YOUNG.
FORK WITH REMOVING PLUNGER.

No. 550,768.  Patented Dec. 3, 1895.

Witnesses.
A. M. O'Bryan
Leonard Altman

Inventor.
Alexander Young.
by G. L. Chapin Atty.

UNITED STATES PATENT OFFICE.

ALEXANDER YOUNG, OF CHICAGO, ILLINOIS.

FORK WITH REMOVING-PLUNGER.

SPECIFICATION forming part of Letters Patent No. 550,768, dated December 3, 1895.

Application filed February 16, 1895. Serial No. 538,716. (No model.)

*To all whom it may concern:*

Be it known that I, ALEXANDER YOUNG, a citizen of the United States, and a resident of Chicago, in the county of Cook and State of Illinois, have invented a new and useful Improvement in a Fork with Removing-Plunger, of which the following is a specification, reference being had to the accompanying drawings, illustrating the invention, in which—

Figure 1:
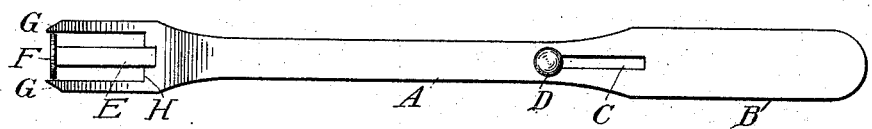
Figure 2:
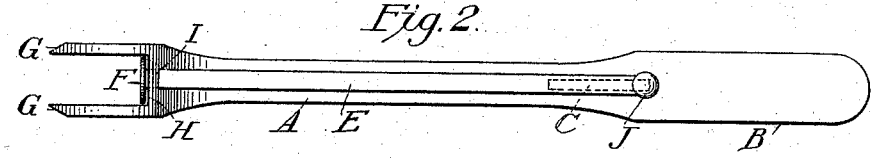
Figure 3:
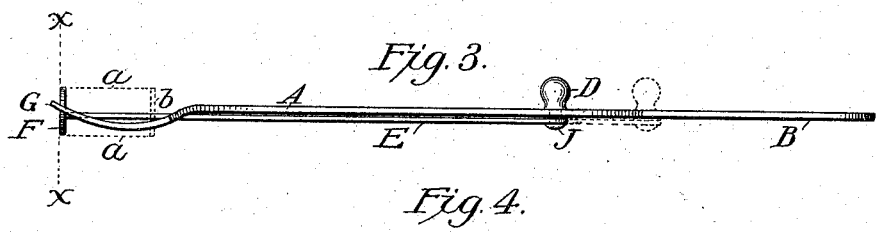
Figure 4:

Figure 1 is a plan at top view of my improved fork and the removing-plunger in position as when an article has been removed from the fork; Fig. 2, an inverted view of Fig. 1; Fig. 3, an edge view of Fig. 1; Fig. 4, a section on line $x$ and elevation.

The purpose of the present invention is to provide novel means to be employed with the fork for removing articles which may be taken up by the fork.

The construction and nature of invention will be fully comprehended by the following detail specification.

A B represent the handle to the fork, which in this case is formed of plate metal of suitable size and strength.

G G represent the tines of the fork, whose inside portions are formed parallel to each other, and their termination with the handle portion A at H forms two right angles, as shown at Figs. 1 and 2, and through the handle portion A at I is formed a slot whose upper and lower margins are parallel with the reciprocating bar E. It will be seen that the handle is bent downward where the slot is formed, whereby the slot is suitable for the bar E to slide in. The bar extends back on the handle portion B and is affixed to the shank J of a knob D, whose middle portion moves in a slot C through the handle, whereby the bar E can be moved back and forth on the handle. The tines G G are bent, as shown at Figs. 1 and 2, and to the end of the bar E is affixed what I term a "remover," which is substantially round in form and substantially fills the space between the tines, and, as shown by dotted lines $a\,a$, Fig. 3, the remover lies at all times above and below the tines.

At Figs. 1 and 3 the remover is shown in position as when material has been removed from the fork, and at Fig. 2 it is shown brought back flat against the straight portion H preparatory to thrusting the tines into some article of food—vegetable or meat. When the fork is so employed, the handle portion B will be grasped by the hand, and when the material is to be removed from the tines the knob D is to be pushed forward by the thumb. The remover F has sufficient area bearing against the article to be removed so as not to crush or mar it.

It is essential that there be no considerable space between the tines and remover, so as to prevent meat and the harder substances from entering between them and being held fast.

The form shown and the special construction are especially important in the accomplishment of the purpose sought. Inasmuch as the remover is formed of light plate metal, the line H on which the forks terminate must be straight to resist the action of articles against the remover when the tines are being engaged to remove the harder substances.

The device should be plated with some non-corrosive substance.

I do not claim a push or removing plunger bar to be new as applied to a table-fork independent of construction; but

I claim—

As an improved article of manufacture a fork composed of a solid flat surfaced handle provided with tines and at its bent portion provided with a slot through which the removing plunger has a reciprocating movement to operate between the tines and the handle provided with a slot and the shank of the removing plunger provided with an operating knob which is guided by the slot, as and for the purpose specified.

ALEXANDER YOUNG.

Witnesses:
G. L. CHAPIN,
C. C. MARCH.